United States Patent
Hall et al.

(10) Patent No.: US 11,563,828 B2
(45) Date of Patent: Jan. 24, 2023

(54) EDGE COMPUTING PLATFORM CAPABILITY DISCOVERY

(71) Applicant: QUALCOMM INCORPORATED, San Diego, CA (US)

(72) Inventors: Edward Robert Hall, Bristol (GB); Alan Soloway, Erie, CO (US); Prashanth Haridas Hande, San Diego, CA (US); Imed Bouazizi, Frisco, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/084,554

(22) Filed: Oct. 29, 2020

(65) Prior Publication Data
US 2021/0136177 A1 May 6, 2021

Related U.S. Application Data

(60) Provisional application No. 62/928,997, filed on Oct. 31, 2019.

(51) Int. Cl.
*G06F 15/16* (2006.01)
*H04L 67/63* (2022.01)
*H04L 67/288* (2022.01)
*H04L 67/289* (2022.01)
*H04L 67/59* (2022.01)

(52) U.S. Cl.
CPC ........... *H04L 67/63* (2022.05); *H04L 67/288* (2013.01); *H04L 67/289* (2013.01); *H04L 67/59* (2022.05)

(58) Field of Classification Search
None
See application file for complete search history.

(56) References Cited

U.S. PATENT DOCUMENTS

| | | | | |
|---|---|---|---|---|
| 2010/0125626 | A1* | 5/2010 | Lucas | H04L 67/1008 709/203 |
| 2014/0098685 | A1* | 4/2014 | Shattil | H04W 72/0453 370/252 |

(Continued)

OTHER PUBLICATIONS

International Search Report and Written Opinion—PCT/US2020/058070—ISA/EPO—dated Feb. 17, 2021.

(Continued)

*Primary Examiner* — Brian Whipple
*Assistant Examiner* — Gregory P Tolchinsky
(74) *Attorney, Agent, or Firm* — Qualcomm Incorporated

(57) ABSTRACT

Systems and methods for establishing a connection with an edge application server are provided. A user equipment (UE) in a wireless communication network establishes a connection with an edge application server to offload the data processing of an application executing on the UE to the edge application server. The UE communicates key performance indicators (KPIs) associated with the application to the edge data network. The KPIs indicate the resources that application uses to process the data. In response, the UE receives edge application server parameters from multiple servers in the edge data network that meet or exceed the KPIs. The parameters include compute, graphical compute, memory and storage parameters with various levels of specificity. The UE selects one of the edge application servers to process the data on behalf of the application based on the parameters.

29 Claims, 9 Drawing Sheets

(56) References Cited

U.S. PATENT DOCUMENTS

| | | | |
|---|---|---|---|
| 2014/0233387 A1* | 8/2014 | Zheng | H04L 47/125 |
| | | | 370/235 |
| 2015/0326899 A1* | 11/2015 | Setos | H04N 21/25841 |
| | | | 725/25 |
| 2018/0069798 A1* | 3/2018 | Bacik | H04L 43/026 |
| 2018/0316746 A1* | 11/2018 | Shattil | H04L 41/147 |
| 2019/0141120 A1* | 5/2019 | Bernat | H04L 67/327 |
| 2020/0244722 A1* | 7/2020 | Jeuk | H04L 67/1021 |
| 2020/0272920 A1* | 8/2020 | Liu | H04L 67/2838 |
| 2020/0322233 A1* | 10/2020 | Gao | H04L 41/5019 |

OTHER PUBLICATIONS

Vodafone: "Pseudo-CR on Proposed Resolution of Editor's Note in KI-2", 3GPP Draft, S6-192022, 3GPP TSG-SA WG6 Meeting #34, 3rd Generation Partnership Project (3GPP), Mobile Competence Centre, 650, Route Des Lucioles, F-06921, Sophia-Antipolis Cedex, France, vol. SA WG6, No. Reno, Nevada, USA, Nov. 11, 2019-Nov. 15, 2019, Oct. 25, 2019 (Oct. 25, 2019), XP051815092, 3 Pages, Retrieved from the Internet: URL:https:/ftp.3gpp.org/tsg_sa/WG6_MissionCriticalfTSGS6_034_Reno/docs/S6-192022.zip, S6-192022.doc [retrieved on Oct. 25, 2019] pp. 1-3.

"3rd Generation Partnership Project; Technical Specification Group Services and System Aspects; Study on Application Architecture for Enabling Edge Applications; (Release 17)", 3GPP Standard; Technical Report, 3GPP TR 23.758, 3rd Generation Partnership Project (3GPP), Mobile Competence Centre, 650, Route Des Lucioles, F-06921, Sophia-Antipolis Cedex, France, No. V1.0.0, Sep. 12, 2019 (Sep. 12, 2019), pp. 1-78, XP051784519, pp. 17, 22-p. 23, p. 10-pp. 19, 36.

* cited by examiner

EDGE COMPUTING PLATFORM CAPABILITY DISCOVERY

CROSS-REFERNCE TO A RELATED APPLICATION

The present application claims priority to and benefit of the U.S. Provisional Patent Application No. 62/928,997, filed Oct. 31, 2019, which is hereby incorporated by reference in its entirety.

TECHNICAL FIELD

This application relates to wireless and data communication systems, and more particularly to a user equipment discovering edge computing capabilities offered by an edge computing network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Wireless communication systems may also communicate with data networks to store, process, and retrieve data. In some instances, UEs may be capable of using the network resources, e.g. servers and storage devices, to process the data generated and used by the applications executing on the UEs. Some data networks, such as enhanced data rates for $5^{th}$ Generation (5G) networks and similar, may supplement or enhance the compute capabilities of UEs by offloading the data computation from the UEs to the edge data network. Because latency in real-time applications may a factor when data computing is offloaded to a data network, the UEs may select the data network components that are geographically proximate to UEs and have available resources to compute data as specified by the applications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects, a method of establishing communication, comprising communicating, by a user equipment (UE), key performance indicators requested by an application executing in the UE, to an edge data network; receiving parameters associated with a plurality of edge application servers in the edge data network, wherein the parameters identify processing capabilities of the plurality of edge application servers and where selected using the key performance indicators; selecting, by a user equipment (UE), an edge application server from the plurality of edge application servers based on the parameters; and processing the data associated with the application using the selected edge application server.

In further aspects, the parameters include at least one processing power parameter indicating processing power of one of the plurality of edge application servers.

In further aspects, the parameters include at least one memory parameter indicating available memory for the application on one of the plurality of edge application servers.

In further aspects, the parameters include at least one storage parameter indicating storage available for the application on one of the plurality of edge application servers.

In further aspects, the processing capabilities accessible to the application are processing capabilities of the UE and processing capabilities of the selected edge application server.

In further aspects, the plurality of edge application servers are within a preconfigured distance from the UE.

In further aspects, the selecting further comprises: identifying the edge application server from the plurality of edge application servers that has a parameter that indicates a lowest latency compared to parameters indicating latencies of other edge application servers in the plurality of edge application servers.

In further aspects, the selecting further comprises identifying the edge application server from the plurality of edge application servers that is associated with parameters that exceed the key performance indicators and that has a parameter that indicates a lowest latency compared to parameters indicating latencies of other edge application servers in the plurality of edge application servers that exceed the key performance indicators.

In further aspects, the selecting further comprises identifying the edge application server from the plurality of edge application servers that has a parameter that indicates a greatest compute power as compared to parameters that indicate computer powers of other edge application servers in the plurality of edge application servers.

In further aspects, the selecting further comprises: identifying the edge application server from the plurality of edge application servers that is associated with parameters that are closest to the key performance indicators as compared to the parameters associated with other edge application servers.

In some aspects, a method of establishing communication with an edge data network, comprising receiving at an edge enabler server in the edge data network, key performance indicators requested by an application executing on a user equipment (UE); receiving geographic location of the UE; selecting edge application servers in the edge data network by matching parameters of the edge application servers and the key performance indicators and wherein the selected edge application servers are less than a configurable distance from the geographic location of the UE; transmitting parameters associated with the selected edge application servers to the UE, wherein the transmitted parameters include processing power of the selected edge application servers; and processing data on behalf of the application using an edge application server from the selected edge application servers.

In further aspects, a parameter in the transmitted parameters includes compute power of a central processing unit of one of the selected edge application servers.

In further aspects, a parameter in the transmitted parameters includes compute power of a graphics processing unit of one of the selected edge application servers.

In further aspects, a parameter in the transmitted parameters includes memory available for the application on one of the selected edge application servers.

In further aspects, a parameter in the transmitted parameters includes memory storage available for the application on one of the selected edge application servers.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
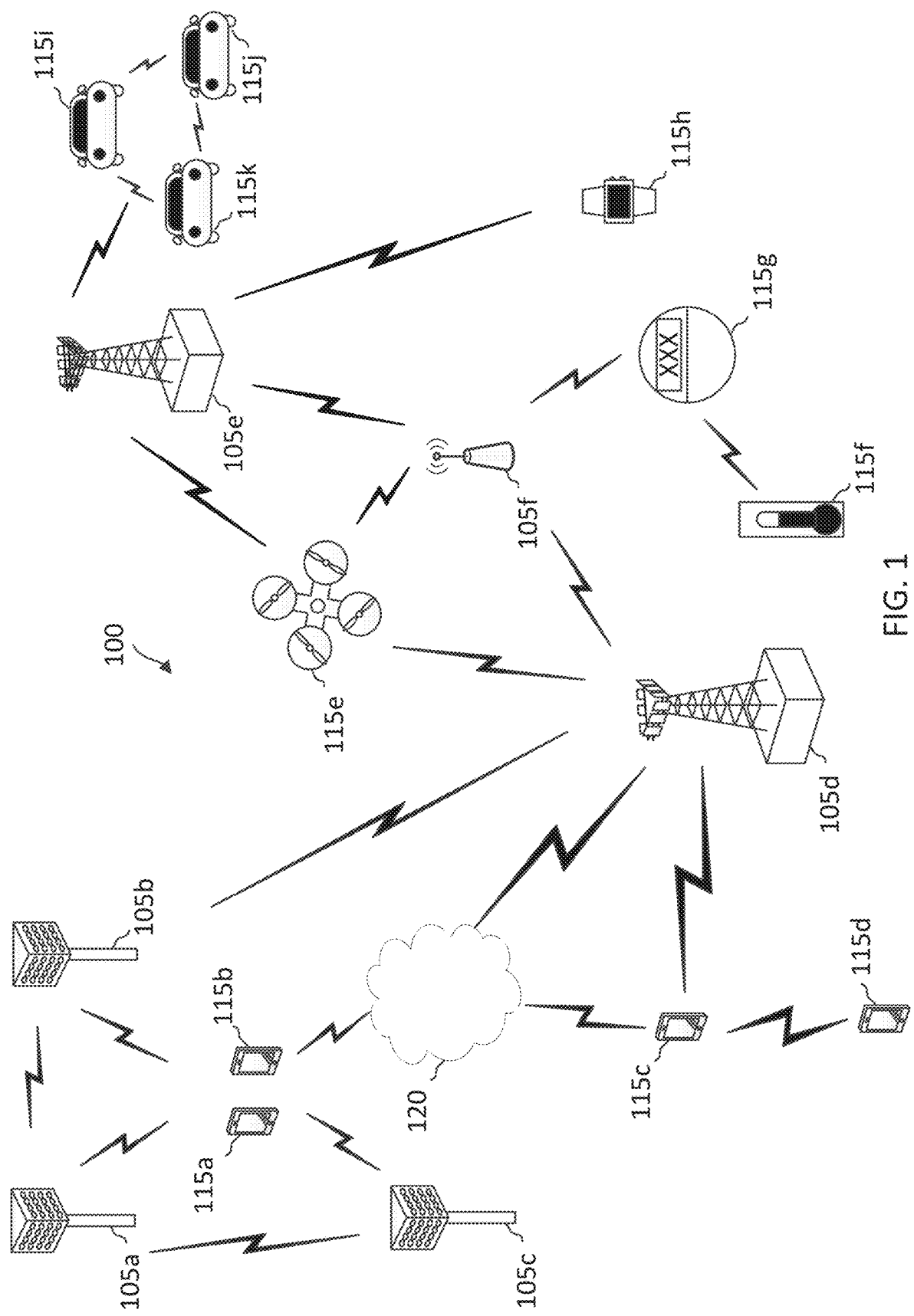
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

This disclosure also relates generally to interactions between a wireless communication system and data networks. Data networks may provide information and resources to user equipment (UE). Some data networks, such as an edge data network, may provide computing resources to applications that execute on UEs. To provide computing resources, data may be transmitted to from the UEs to the resources in the edge data network, computed or acted upon, and then transmitted from the edge data network to the UEs. The UE reaps multiple benefits by offloading data from the UE for processing by the edge data network, including conserving battery power by offloading resource intensive computations, allowing the UE to perform other tasks and execute other applications while the data is being processed, and allowing resources designed to handle computationally intensive tasks to process data.

Due to the mobile nature of the UEs in the wireless communication network, latency may be a factor when the data is transmitted between the UEs and the edge data network. To reduce latency, the edge data network may allocate the resources to the UEs that are within geographic proximity to the UEs. Further, the edge data network may also allocate resources that have at least the computing capabilities that meet the minimum resources required by the applications that execute on the UEs.

In some aspects, the resources or services that the edge data network provides may be augmented into the device capabilities of the UEs. In this way, the capabilities of the UE, e.g. central processing unit capabilities (CPU), graphics processing unit (GPU) capabilities, available memory and storage may be the combination of the CPU, GPU, memory and storage capabilities of the UE and the CPU, GPU, memory and storage capabilities of one or more resources in the edge data network. The resources may be the edges or servers within the edge data network that may compute data on behalf of UEs.

In some aspects, each application that may execute on UE may include preconfigured compute requirements for CPU, GPU, memory, storage, etc. As the application requirements may exceed the capabilities of the UE, the UE may determine capabilities of the resources in the edge data network that meet or exceed the application requirements and may offload the data to these resources. In conventional systems, when UE obtains the capabilities of the resources in the edge data network, the UE may receive a uniform resource locator or an Internet Protocol address of the resource in the edge data network. This approach, however, does not allow the UE to select among multiple available resources that meet the application requirements or identify capabilities of each resource. Accordingly, the aspects described below, identify techniques where the edge data network provides the UE with parameters that identify capabilities of various resources in the edge data network. The aspects below also describe techniques that the UE may use to determine a resource in the edge data network based on the parameters.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless communication network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, wireless communication network 100, BSs 105 and UEs 115 may communicate with a data network. A data network may include resources that enable transmission, storage and processing of data, such as servers, routers, hubs, etc., that facilitate data storage and processing among network devices, including UEs 115. In some aspects, a data network may provide resources that UEs 115 (and also other components in the wireless communication system) may use to compute data on behalf of UEs 115. Such example data network may be an edge data network 120. The edge data network 120 includes distributed network resources, including servers and data stores that may receive data from applications that execute on UEs 115, perform computing actions of the data, and then transmit the resulting data back to the UEs 115. In some aspects, the edge data network 120 may allocate resources to the UE 115 that are within geographic proximity of the UE 115 thus providing for a shorter traveling path between the UE 115 and the resource(s). Geographic proximity may be measured as a configurable distance between UE 115 and the resource in edge data network 120. Because the path between the UE 115 and the resource(s) in the edge data network is geographically closer or shorter than in e.g. a conventional cloud network, the data that is processed by the edge data network 120 may be processed using lower latency and higher bandwidth. Further, because the edge data network 120 may allocate resources based on the geographic proximity, the edge data network 120 may allocate different resources to UE 115 based on the location of the UE 115. Accordingly, UEs 115 that are located in different locations (or the same UE 115 when in different geographic locations) may accesses different processing resources within edge data network 120 to processes the data from an application that has the same processing requirements.

Further, there may be multiple edge data networks 120 covering various geographic areas. This allows UEs 115 to obtain access to the resources of the closest edge data network 120 as long as the UEs 115 are able establish a connection with the closest edge data network 120. This also allows UEs 115 to switch between edge data networks 120 as UEs 115 change geographic locations.

In some aspects, edge data network 120 may provide compute capabilities to the UE 115. This allows UE 115 to offload the data processing from UE 115 to edge data network 120 thus increasing the battery life of UE 115. This also increases the perceived compute capability of UE 115 because by offloading the compute capability, the UE 115 may compute the data using the resources of the edge data network 120 that are specifically designed for high throughput computation. This also allows UE 115 to process data using compute resources that exceed the resources available on the UE 115.

Figure 2:
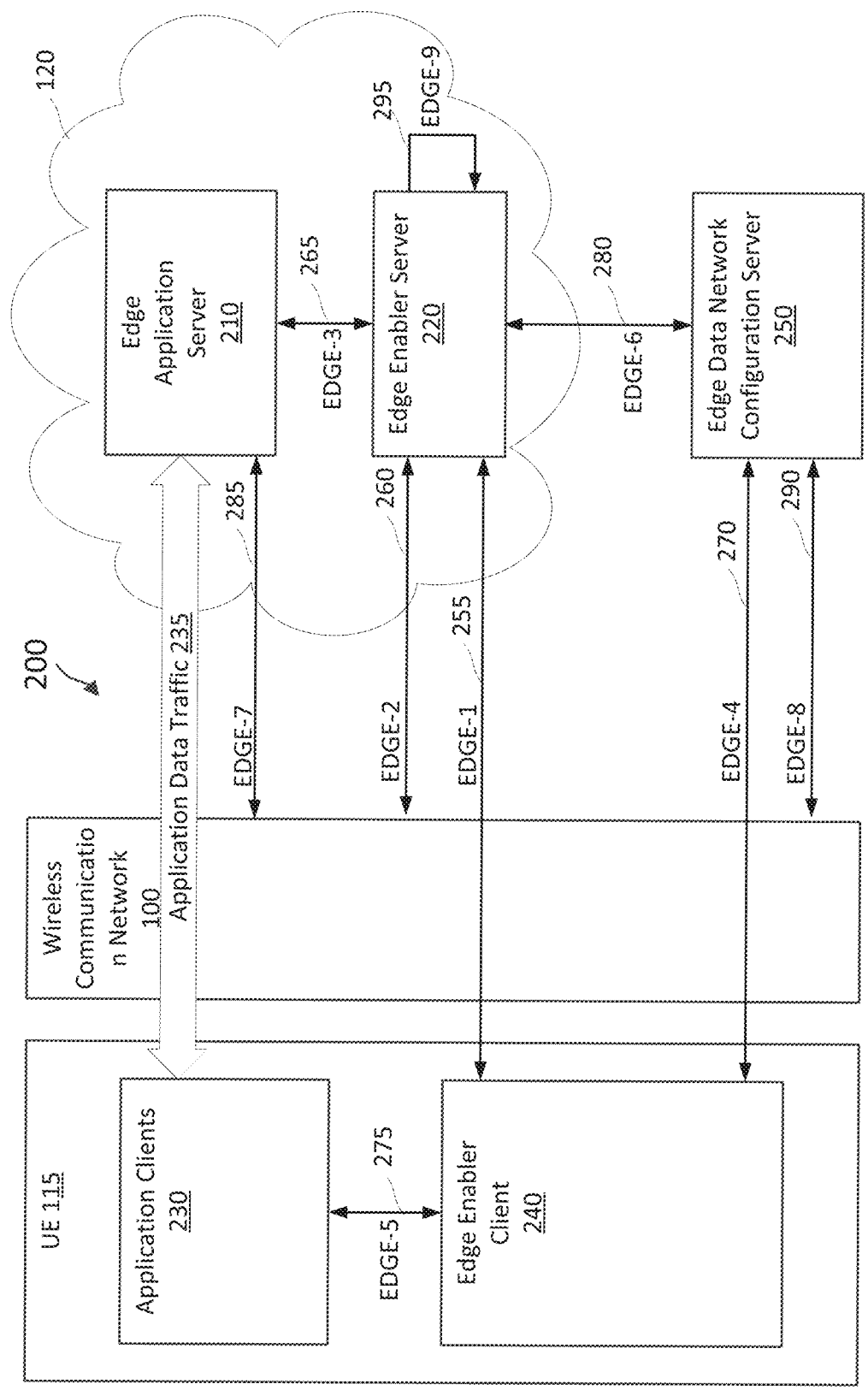
FIG. 2 illustrates an edge data network according to some aspects of the present disclosure.

FIG. 2 is a block diagram 200 of an edge data network, according to some aspects of a present disclosure. As illustrated in FIG. 2, edge data network 120 may communicate with wireless communication network 100 and UEs 115. Edge data network 120 may include one or more edge application servers 210 and edge enabler server 220. In some aspects, edge application servers 210 may include compute resources that are distributed throughout edge data network 120 and may be available to UEs 115. Also, various application providers may upload different application and services to edge application servers 210 that may be available UEs 115.

In some aspects, edge enabler server 220 manages edge application servers 210 that execute in edge data network 120. Edge enabler server 220 may receive various resource parameters from edge application servers 210. The resource parameters may indicate compute capabilities available on edge application servers 210 and are described in detail below. Edge enabler server 220 may also track resources that are available on edge application servers 210 and may advertise these resources to UEs 115. Edge enabler server 220 may provision configuration information and resource parameters to UEs 115 and wireless communication network 100. Additionally, edge enabler server 220 may facilitate discovery of edge application servers 210 by UEs 115 that may compute data on behalf of UEs 115.

In some aspects, UEs 115 may include application clients 230 and edge enabler client 240. Application clients 230 may be applications that perform various tasks while executing on UEs 115. Application clients 230 may be pre-installed, downloaded or otherwise installed on UEs 115. Example application clients 230 may be mobile games, virtual reality applications, etc. Each application client 230 may include key performance indicators, such as CPU, GPU, memory, storage, latency, bandwidth, etc., indicators that application client 230 may require to process data. Notably, KPIs associated with application clients 230 may exceed the resources available on UE 115, which indicates that UE 115 may attempt to obtain the additional resources from edge data network 120.

When application client 230 requires resources that exceed those available on UE 115, application client 230 may attempt to have UE 115 to offload data for processing to edge application server(s) 210. In this case, UE 115 may select the edge application server 210 that has available resources to process data generated by application client 230 and augment the capabilities of UE 115 with capabilities available on the edge application server 210. Once UE 115 establishes a connection with edge application server 210, UE 115 may offload the data processing to edge application server 210. The communication of data between application client 230 and the selected edge application server 210 may be referred as application data traffic 235.

In some aspects, edge enabler client 240 may discover one of edge application servers 210 that may compute data for UE 115. Edge enabler client 240 may also provide the parameters, e.g. URL or IP address to application client 230 to establish a connection with the edge application server 210 to access the resources of edge application server 210. Edge enabler client 240 may be software, firmware, or hardware included in UE 115.

In some aspects, FIG. 2 includes an edge data network configuration server 250. The edge data network configuration server 250 provides an interface between multiple edge data networks 120 and UEs 115. Edge data network configuration server 250 provides supporting functions needed for UE 115 to connect with edge enabler server 220. For example, edge data network configuration server 250 may provision configuration information of edge enabler server 220 to edge enabler client 240. The configuration information may include information for UEs 115 to connect to edge data network 120 and service area information of edge data network 120. The configuration information may also include information, e.g. a URL or IP address for establishing a connection with edge enabler server 220 of edge data network 120. In this way, because UE 115 may have connection information of various edge data networks 120, UE 115 may switch among edge data networks 120 as UE 115 changes its geographic location.

In some aspects, the components illustrated in FIG. 2 may communicate using various communication paths, also referred to as edges. In some aspects, edge enabler server 220 and edge enabler client 240 may communicate using EDGE-1, labeled edge 255. EDGE-1 may support communications that discover edge application servers 210 available in edge data network 120 for UE 115.

In some aspects, edge enabler server 220 and wireless communication network 100 may communicate using EDGE-2, labeled edge 260. EDGE-2 may support communications that cause edge enabler server 240 to retrieve network capability and UE 115 information from wireless communication network 100, e.g. from BS 105 or from component discussed in FIG. 1. For example, edge enabler server 220 may use EDGE-2 to retrieve information associated with geographic location of UE 115, subscription services used by UE 115, whether UE 115 is about to change cells or BSs 105, etc. In some aspects, edge application server 210 may also send a request message to wireless communication network 100 for additional bandwidth or increased QoS for UE 115.

In some aspects, edge enabler server 220 and edge application server 210 may communicate using EDGE-3, labeled edge 265. When edge application server 210 is installed within edge data network 120, edge application server 210 may register with edge enabler server 220 using EDGE-3. The registration may include parameters that indicate to edge enabler server 220 resources, e.g. CPU, GPU, memory, storage, etc., available on edge application server 210. EDGE-3 may also provide edge application server 210 with availability information, e.g. time constraints, location constraints, etc., that is may need to compute data for application clients 230 of UE 115. Also, EDGE-3 may provide edge application server 210 with network capability information that edge enabler server 220 obtained from wireless communication network 100 using EDGE-2.

In some aspects, the edge data network configuration server 250 and edge enabler client 240 may communicate using EDGE-4, labeled edge 270. EDGE-4 may communicate configuration information for edge data network 120 and edge enabler server 220 from edge data network configuration server 250 to edge enabler client 240.

In some aspects, application clients 230 and edge enabler client 240 in UE 115 may communicate using EDGE-5, labeled as edge 275. Using EDGE-5, application clients 230 may obtain information, e.g. URL or IP address associated with edge application server(s) 210 with which application clients 230 may establish a connection. Over EDGE-5, application clients 230 may also receive notification events related to the existing connections between application clients 230 and edge application servers 210. Example notification events may include processing notifications, whether UE 115 may need to switch to another edge application server 210, potential latency issues, etc.

In some aspects, edge data network configuration server 250 and edge enabler server 220 may communicate using EDGE-6, labeled as edge 280. Edge enabler server 220 may use EDGE-6 to register information associated with edge enabler server 220 with edge data network configuration server 250. Similarly, edge data network configuration server 250 may provision edge enabler server 220 with information associated with edge data network configuration server 250.

In some aspects, edge application server 210 and wireless communication network 100 may communicate using EDGE-7, labeled edge 285. EDGE-7 may support communications that cause edge application server 210 to retrieve network capability and UE 115 information from wireless communication network 100. Similar to the network capability information transmitted using EDGE-2, edge application server 210 may use EDGE-7 to retrieve information associated with geographic location of UE 115, subscription services used by UE 115, whether UE 115 is about to change cells in wireless communication network 110, etc.

In some aspects, edge data network configuration server 250 may communicate with wireless communication network 100 using EDGE-8, labeled as edge 290. Edge data network configuration server 250 may use EDGE-8 to request network capability information from wireless communication network 100, and wireless communication network 100 may transmit the network capability information to edge data network configuration server 250.

In some aspects, there may be multiple edge enabler servers 220 in the edge data network (not shown). In these aspects, edge enabler servers 220 may communicate with each other over EDGE-9, labeled as edge 295. The communication may include information, such as metadata and application context information associated with the respective edge application servers 210 that are communicatively coupled to respective edge enabler servers 220 over EDGE-3.

As discussed above, UE 115 may offload data generated by application client 230 for processing to edge application server 210. Prior to offloading the data, UE 115 may discover resources that are available on edge application servers 210, whether the resources meet the requirements of application client 230, and which edge application servers 210 are available. Conventionally, UE 115 may discover the edge application servers using a domain name service (DNS) that stores locations of the conventional edge application servers within an edge data network. The UE 115 may then receive an URL or an IP address of the conventional edge application server that can provide a service to UE 115. The UE 115 however does not know the parameters or capabilities that are available on the conventional edge application server, other than that the parameters and capabilities are sufficient for the application client executing on UE 115.

In some aspects, UE 115 may attempt to discover edge application server 210 using edge enabler client 240. Edge enabler client 240 may use EDGE-4 to issue a request message to edge data network configuration server 250 to identify one or more edge data networks 120. The edge data network configuration server 250 may send a response message to edge enabler client 240. The response message may identify one or more available edge data networks 120 that are within a geographic area of UE 115. Edge enabler client 240 may then select one or more edge data networks 120 from the available edge data networks 120.

Next, edge enabler client 240 may send a request message to edge enabler server(s) 220 associated with the selected edge data network 120 over EDGE-1. The request message may include a request for available edge application servers 210. In the request message, edge enabler client 240 may include parameters, e.g. key performance indicators (KPI) associated with application client 230. For example, the KPIs may indicate that application client 230 that is a storage intensive application may need latency that is less than 1 millisecond, 4 cores of CPU running at 3 GHz each, 3 gigabytes of virtual memory, and 3 terabytes of virtual storage. In response to the request message, edge enabler client 240 may receive from edge enabler server 220 a response message that includes URLs to one or more edge application servers 210 that may perform computing functions for application client 230 that satisfy the KPIs. Additionally, the response message may include edge application server parameters that further define capabilities of each edge application server 210 that meets or exceeds the KPIs. The example parameters for each edge application server 210 may be available CPU compute capability, available graphical compute capability, available memory, available storage, latency (an estimated achievable round trip time in milliseconds for the data to travel to and from application client 230 and edge application server 210), and an estimated achievable connection bandwidth measured in, e.g. kilobytes per second for application data traffic 235 communicated between application client 230 and edge application server 210.

In some aspects, edge enabler client 240 may receive a single response message that includes parameters for edge application servers 210 that meet the KPIs for application client 230. In other aspects, edge enabler client 240 may receive multiple response messages, where each response message includes parameters for one of edge application server 210 that meet KPIs for application client 230. Edge enabler client 240 may receive the response message(s) over EDGE-1

In some aspects, edge enabler client 240 may use the parameters in the response message(s) to compare capabilities of the available edge application servers 210 and select one of edge application servers 210 based on the capabilities. Edge enabler client 24 may use multiple algorithms to select edge application server 210 from the available edge application servers 210. Using a first algorithm, edge enabler client 240 may select edge application server 210 that has a highest CPU and/or graphics compute power. Using a second algorithm, edge enabler client 240 may assign a score to each of the edge application server parameters and select the edge application server 210 that is associated with the parameters that have the highest score. Using a third algorithm, edge enabler client 240 may select edge application server 210 that is a match or the closest match to the KPIs associated with application client 230. Using a fourth algorithm, edge enabler client 240 may select edge application server 210 with parameters that match or exceed the KPIs associated with application client 230 and that also has the lowest latency. Using a fifth algorithm, edge enabler client 240 may determine that one edge application server 210 does not have enough available resources, e.g. the memory may not meet the KPIs, and may not select the edge application server 210. Using a sixth algorithm, edge enabler client 240 may determine that one or more edge application servers 210 have extra processing capabilities and may turbo-charge processing for application client 230 by increasing at least one KPI in the KPIs and requesting additional compute resources to process data associated with application client 230. In response, edge enabler client 240 may receive edge application parameters that meet the increased KPIs and may select the edge application server 210 using the received edge application parameters.

In some aspects, once edge enabler client 240 selects edge application server 210, edge enabler client 240 may communicate the URL and the parameters of the selected edge application server 210 to application client 230 using EDGE-5. Application client 230 may then establish a connection and exchange application data traffic 235 with the selected edge application server 210. In this way, the processing capability of UE 115 may be processing capability of UE 115 and processing capability of the selected edge application server 210.

In some aspects, edge application server 210 may further define the compute, graphical compute, available memory, and available storage parameters. For example, edge application server 210 may further define the parameters using the Moving Picture Experts Group (MPEG) network based media processing parameters. Using the MPEG network based media processing parameters, edge application server 210 may define parameter as follows:

CPU Cores: may further define a compute parameter to indicate a minimum number of CPU cores that edge application server 210 may allocate to processing data from application client 230;

GPU: may further define a graphical compute parameter to indicate a minimum number of GPUs that edge application server 210 may allocate to processing data from application client 230;

Aggregated storage: may further define a memory parameter to indicate aggregate storage that edge application server 210 may allocate for processing data from application client 230.

vcpu: may further define a compute parameter to indicate a number of virtual CPUs that edge application server 210 may allocate for processing data from application client 230.

vgpu: may further define a graphical compute parameter to indicate a number of virtual GPUs that edge application server 210 may allocate for processing data from application client 230.

ram: may further define a memory parameter to indicate memory that edge application server 210 may reserve for processing data from application client 230.

disk: may further define a memory parameter to indicate disk memory that edge application server 210 may reserve for processing data from application client 230.

Notably, edge application server 210 may designate each of the above parameters as an integer, unsigned integer, float, unsigned float, etc. In this way, edge enabler server 220 may provide edge enabler client 240 with fine-tuned parameters that demonstrate resources and capabilities of edge application servers 210.

In another example, edge application server 210 may further define the parameters using the ETSI network function virtualization parameters. The ETSI network function virtualization definitions may define the compute, graphical compute, memory, and storage parameters with greater specificity than the MPEG network base media processing parameters. For example, edge application server 210 may further define the compute parameter with the following parameters:

CpuArchitecture: may define a CPU architecture type, e.g. x86, RAM, available on edge application server 210.

numVirtualCpu: may define a number of virtual CPUs available on edge application server 210.

virtualCpuClock: may define a minimum virtual CPU clock rate, e.g. in MHz, available on edge application server 210 for each of the virtual CPUs.

virtualCpuOversubscriptionPolicy: may define a relationship between virtual CPU cores and physical CPU cores and/or threads available on edge application server 210.

virtualCpuPinning: may define virtual CPU pinning configuration for the virtualized compute resource available on edge application server 210.

In another example, edge application server 210 may further define the graphical compute parameter with the following parameters:

gpuArchitecture: may define a GPU architecture type, e.g. GPGPU, available on edge application server 210.

numVirtualGpu: may define a number of virtual GPUs available on edge application server 210.

virtualGpuClock: may define a minimum virtual GPU clock rate, e.g. in MHz for each of the GPUs available on edge application server 210.

In another example, edge application server 210 may further define the memory parameter with the following parameters:

virtualMemSize: may define an amount of virtual memory, e.g. in MBs, available on edge application server 210.

virtualMemOversubscriptionPolicy: may define the memory core oversubscription policy in terms of virtual memory to physical memory available on edge application server 210.

numaEnabled: may define the memory allocation to be cognizant of relevant process or core allocations on edge application server 210.

In another example, edge application server 210 may further define the storage parameter with the following parameters:

id: may define a unique identifier of a virtual storage descriptor available on edge application server 210.

typeOfStorage: may define a virtual storage resource, e.g. volume, object, etc., available on edge application server 210.

sizeOfStorage: may define a size of virtualized storage resource, e.g. size of volume in giga-bytes available on edge application server 210.

rdmaEnabled: may indicate if storage supports remote direct memory access (RDMA).

swImageDesc: may indicate if a software image may be loaded on the virtual storage resource created based on virtual storage descriptor that is available on edge application server 210.

In some aspects, once edge application server 210 determines the values for the edge application server parameters, edge application server 210 may communicate the parameters to edge enabler server 220 over EDGE-3. Edge enabler server 220 may periodically update the parameters based on the availability at edge application server 210. The edge application parameters may be defined using various levels of specificity discussed above. The edge enabler server 220 may store the parameters from various edge application servers 210. When the edge enabler server 220 receives a request message for the edge application server parameters of one or more edge application servers 210, the edge enabler server 220 may compare the KPIs in the request to the parameters of the edge application servers 210 and select the parameters of edge application server(s) 210 that meet or exceed the KPIs. Edge enabler server 220 may then generate one or more response message(s) that include the parameters of the selected edge application server(s) 210 and communicate the response message(s) to edge enabler client 240 over EDGE-1.

In some aspects, once edge enabler client 240 executing in UE 115 receives the response message with edge application server parameters associated with edge application server(s) 210, edge enabler client 240 may select the edge application server 210 using one or a combination of the algorithms discussed above. Once the edge enabler client 240 selects edge application server 210, edge application server 210 may augment the resources of UE 115 with the capabilities of edge application server 210.

In some aspects, UE 115 may store the combined capabilities of UE 115 and the selected edge application server 210 in the device features storage available on UE 115. Other UEs 115 or application clients 230 may access the capabilities of UE 115 from the device features storage using an application programming interface or an operating system that executes on UE 115.

Figure 3A:
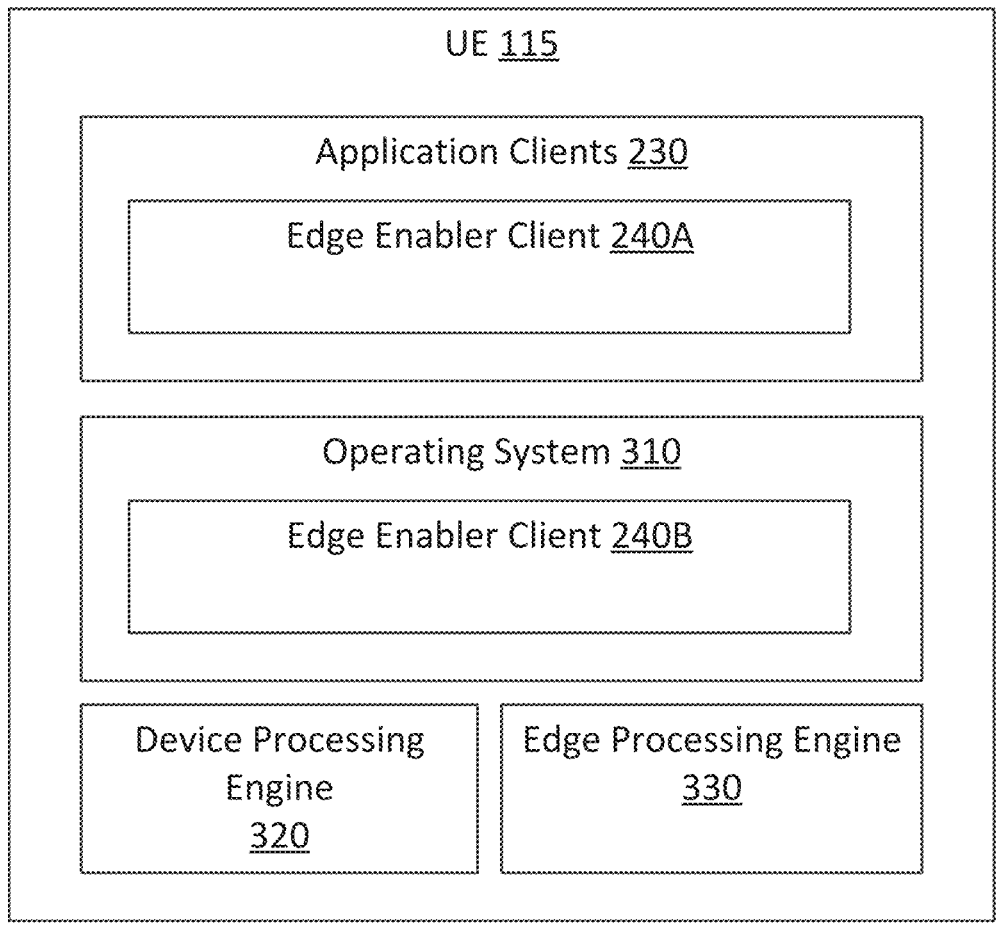
FIGS. 3A-3B are block diagrams of exemplary user equipment (UE) according to some aspects of the present disclosure.

In some aspects, edge enabler client 240 may be implemented within different components in UE 115. Edge enabler client 240 may be implemented in software, e.g. within application client 230, within an operating system executing in UE 115, or as part of a modem middleware. Edge enabler client 240 may also be downloaded as an application that executes on UE 115 as part of an infrastructure that is associated with edge data network 120. FIG. 3A is an exemplary block diagram of UE components that include an edge enabler client, according to some aspects of the disclosure. As illustrated in FIG. 3A, UE 115 may include application clients 230, operating system 310, device processing engine 320, and edge processing engine 330. The operating system 310 may be an android, an iOS, or another type of an operating system that manages hardware and software resources on UE 115. Device processing engine 320 may be a combination of hardware and software capabilities that execute on UE 115 and process data generated by application clients 230, operating system 310, etc. Edge processing engine 330 may be processing capabilities that are available to UE 115 via the selected edge application server(s) 210 in edge data network 120 and that process data generated by application clients 230 at edge application server(s) 210. Together device processing engine 320 and edge processing engine 330 may be the processing capabilities for processing application client(s) 230.

As illustrated in FIG. 3A, edge enabler client 240 may be implemented in software. For example, edge enabler client 240A may be implemented within application client 230. In this case there may be multiple edge enabler clients 240A, one edge enabler client 240A for each application client 230. In another example, edge enabler client 240B may be implemented within operation system 310. In this case, there may be one edge enabler client 240B for multiple application clients 230.

Figure 3B:
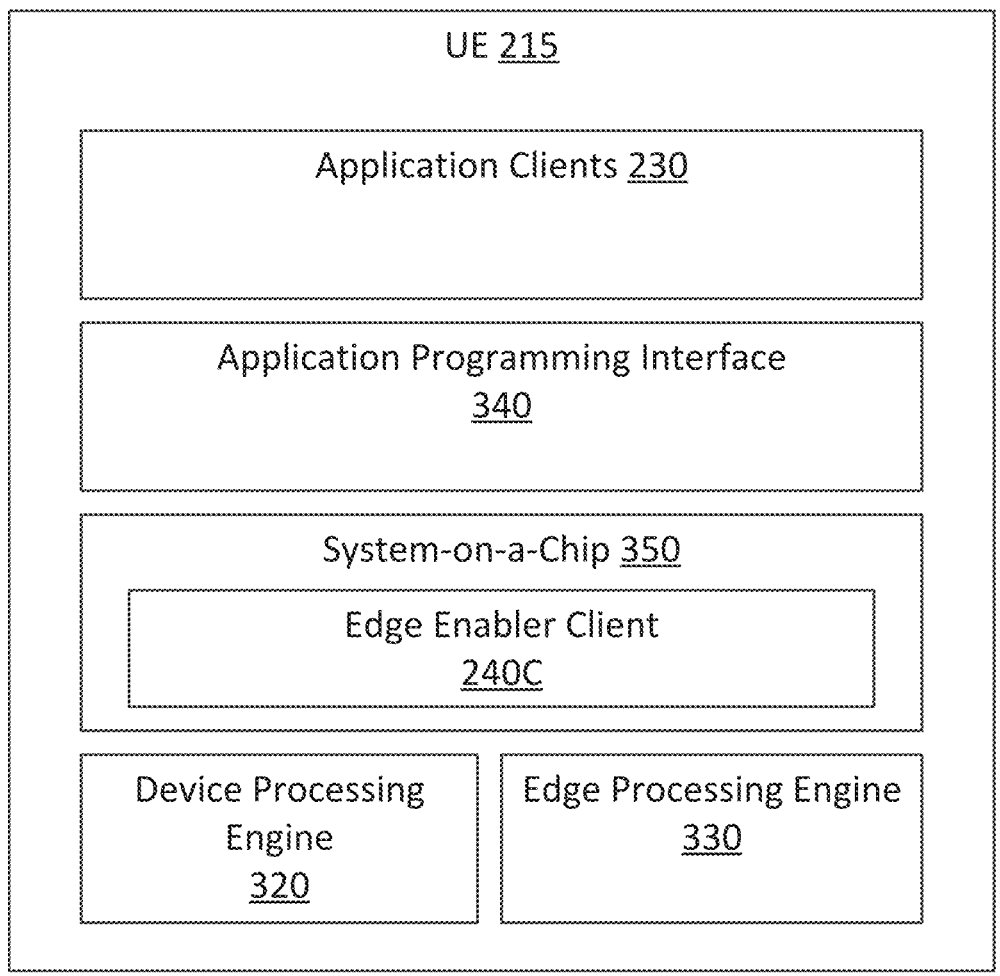

In some aspects, edge enabler client 240 may be implemented in hardware, e.g. as part of a system-on-a chip included in UE 115. FIG. 3B is an exemplary block diagram of UE components that include an edge enabler client, according to some aspects of the disclosure. Similarly, to FIG. 3A, UE 115 in FIG. 3B includes application clients 230, device processing engine 320, and edge processing engine 330. The UE 115 in FIG. 2B also includes an application programming interface (API) 340 and a system-on-a-chip 350 hardware. Application clients 230 may communicate with device processing engine 320 and edge processing engine 330 using application programming interface 340. System-on-a-chip 350 may be an integrated circuit that integrates hardware components of UE 115. These components may include a processor, memory, input/output ports, etc. The processor and memory are discussed in detail in FIG. 5. Although not shown, system-on-a-chip 350 may include some or all hardware components of device processing engine 320.

In some aspects, system-on-a-chip 350 may include edge enabler client 240 that is implemented in hardware, such as edge enabler client 240C. In this case, edge enabler client 240C is a component of an integrated circuit included in system-on-a-chip 350. When edge enabler client 240C is implemented on a system-on-a-chip 350, edge enabler client 240C may receive parameters associated with application clients 230 over API 340. API 340 may be software that may access parameters associated with application clients 230 and pass the parameters to edge enabler client 240C or vice versa.

Figure 4:
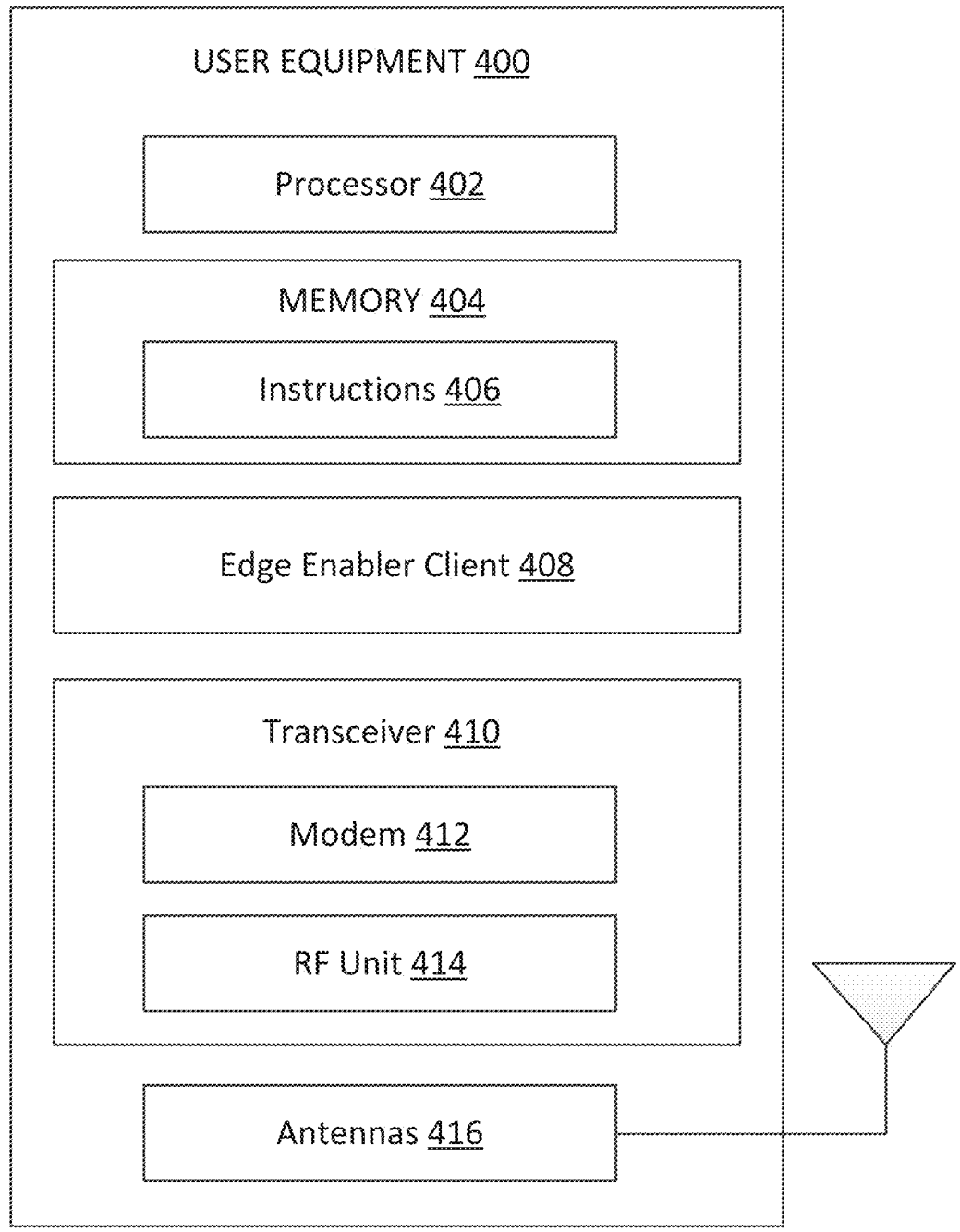
FIG. 4 is a block diagram of an exemplary user equipment (UE) according to some aspects of the present disclosure.

FIG. 4 is a block diagram of an exemplary UE 400 according to some aspects of the present disclosure. The UE 400 may be a UE 115 discussed above in FIG. 1. As shown, the UE 400 may include a processor 402, a memory 404, an edge enabler client 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 2-3 and 7-8. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The edge enabler client 408 may be implemented via hardware, software, or combinations thereof. Edge enabler client 408 may be edge enabler client 240 discussed in FIGS. 2-3. For example, the edge enabler client 408 may be implemented as a processor, circuit, and/or instructions 406 stored in the memory 404 and executed by the processor 402. In some instances, the edge enabler client 408 can be integrated within the modem subsystem 412. For example, the edge enabler client 408 can be implemented by a combination of software components (e.g., executed by a DSP or a general processor) and hardware components (e.g., logic gates and circuitry) within the modem subsystem 412.

The edge enabler client 408 may be used for various aspects of the present disclosure, for example, aspects of FIGS. 2-3 and 7-8. The edge enabler client 408 may obtain computing capabilities from one or more edge application servers 210 in edge data network 120 on behalf of one or more application clients 230 that execute on UE 400. As discussed above edge enabler client 408 may receive KPIs from application client 230 and generate a request message to edge enabler server 220 that includes the KPIs. In response, edge enabler client 408 may receive a response message that includes the parameters of one or more edge application servers 210 that meet or exceed the requested KPIs. Edge enabler client 408 may then select edge application server 210 for application client 230 based on the received parameters. Edge enabler server 220 may also transmit a request for additional computing resources to the selected edge application server 210 when the parameters of the selected edge application server 210 exceed the requested KPIs. Edge enabler client 408 may transmit the URL of the selected edge application server 210 to the application client 230 to establish the connection and communicate application data traffic 235 with the selected edge application server 210.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the edge enabler client 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUSCH data) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 510, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
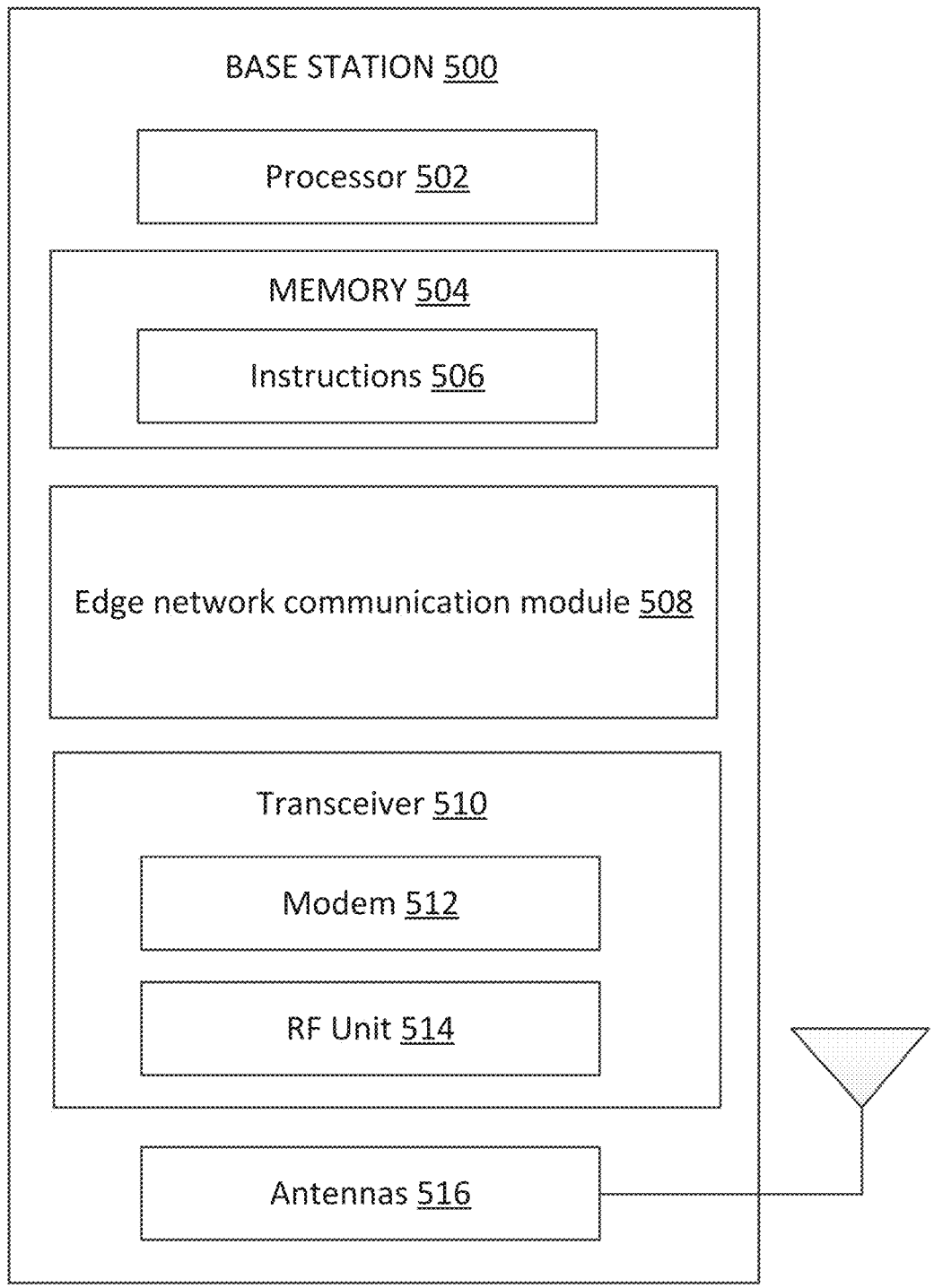
FIG. 5 is a block diagram of an exemplary base station (BS) according to some aspects of the present disclosure.

FIG. 5 is a block diagram of an exemplary BS 500 according to some aspects of the present disclosure. The BS 500 may be BS 105 in the network 100 as discussed above in FIG. 1. A shown, BS 500 may include a processor 502, a memory 504, edge network communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 7-8. Instructions 506 may also be referred to as code, which may be interpreted broadly to include any type of computer-readable statement(s) as discussed above with respect to FIG. 4.

Each of the edge network communication module 508 may be implemented via hardware, software, or combinations thereof. For example, each of the edge network communication module 508 may be implemented as a processor, circuit, and/or instructions 506 stored in the memory 504 and executed by the processor 502. In some examples, the edge network communication module 508 can be integrated within the modem subsystem 512. For example, the edge network communication module 508 can be implemented by a combination of software components (e.g., executed by a DSP or a general processor) and hardware components (e.g., logic gates and circuitry) within the modem subsystem 512.

The edge network communication module 508 may be used for various aspects of the present disclosure, for example, aspects of FIGS. 1-3 and 7-8. The edge network communication module 508 may be configured to communicate with edge data network 120 and components within edge data network, e.g. edge application server 210 and edge enabler server 220 to provide information associated with UEs 115, 400 or with wireless communication network 100. As discussed above, the example information may be geographic location of the UEs 115.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 500 according to some aspects of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
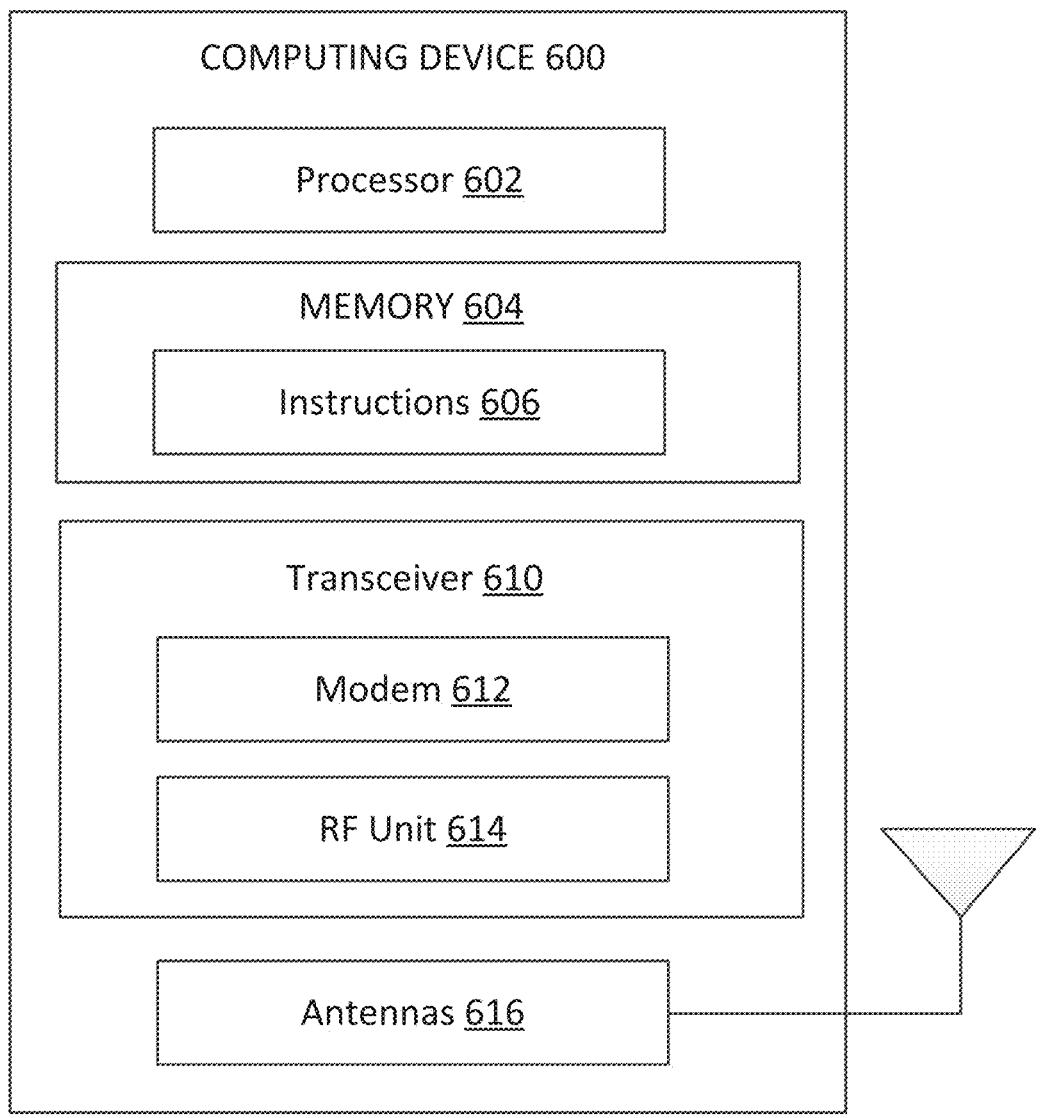
FIG. 6 is a block diagram of an exemplary computing device according to some aspects of the present disclosure.

FIG. 6 is a block diagram of an exemplary computing device 600 according to some aspects of the present disclosure. The computing device 600 may be edge application server or edge enabler server 220 discussed in FIG. 2. A shown, the computing device 600 may include a processor 602, a memory 604, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a GPU, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration. Processor 602 may be further configured to high throughput computing and include multiple CPUs, DSPs, GPUs, ASICs, controllers, FPGA devices, etc., or a combination thereof.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 2-3 and 7-8. Instructions 606 may also be referred to as code, which may be interpreted broadly to include any type of computer-readable statement(s) as discussed above with respect to FIG. 4. Memory 604 may be further designed for large scale storage or for processing and computing large quantities of high throughput data.

As shown, the transceiver 610 may include the modem subsystem 612 and the RF unit 614. The transceiver 610 can be configured to communicate bi-directionally with other devices, such as the UEs 115 and/or 400 and/or another core network element in wireless communication network 100 or edge data network 120. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 and/or UE 400. The RF unit 614 may be further configured to perform analog beamforming in conjunction with the digital beamforming. Although shown as integrated together in transceiver 610, the modem subsystem 612 and/or the RF unit 614 may be separate devices that are coupled together to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with UE 115 or 400 according to some aspects of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

Figure 7:
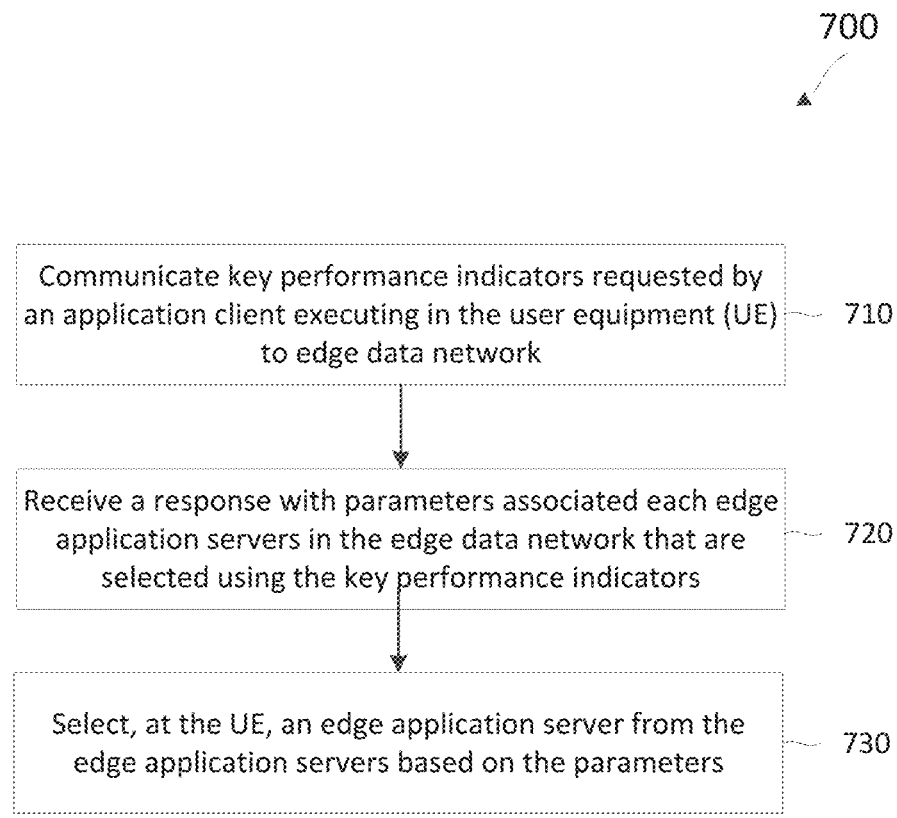
FIG. 7 is a flow diagram of a method according to some aspects of the present disclosure.

FIG. 7 is a flow diagram of a communication method 700 according to some aspects of the present disclosure. Steps of the method 700 can be executed by a computing device (e.g., a processor, processing circuit, and/or other suitable component) of a wireless communication device or other suitable means for performing the steps. For example, a wireless communication device, such as the UE 115 or 400, may utilize one or more components, such as the processor 402, the memory 404, the edge enabler client 240, 408, the transceiver 410, the modem 412, and the one or more antennas 416, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At step 710, the method 700 includes communicating parameters that include key performance indicators (KPIs) from UE 115 to edge data network. For example, application client 230 executing on UE 115 communicates KPIs associated with, or requested by, application client 230 to edge enabler client 240 in UE 115. The KPIs indicate resources, e.g. compute power, memory, storage, etc., that application client 230 may require from UE 115. The edge enabler client 240 may transmit or communicate the KPIs in a request message to edge enabler server 220 in edge data network 120.

At step 720, the method 700 includes communicating the response message that includes edge application server parameters of edge application server(s) 210 in edge data network 120 that meet or exceed the KPI parameters. The parameters may identify processing capabilities of edge application server(s) 210 and may be selected using the key performance indicators. These edge application servers 210 may be candidates for performing compute applications on behalf of application client 230. Accordingly, in some aspects, UE 115 receives parameters (e.g., the edge application server parameters) associated with a plurality of edge application servers (e.g., edge application servers 210) in edge data network 120.

At step 730, the method 700 includes selecting one of edge application servers 210 based on the edge application server parameters received in step 730. As discussed above, edge enabler client 240 may use one or more algorithms and the edge application server parameters to select the edge application servers 210. For example, edge enabler client 240 may select the edge application server 210 with edge application server parameters that meet or exceed the KPIs and have the lowest latency in processing and transmitting data. In some embodiments, once one of the edge application servers 210 is selected, edge enabler client 240 may communicate the parameters of the selected edge application server 210 to application client 230 that requested the resources of the edge application server 210. The parameters may include a URL or an IP address that application client 230 may use to establish a connection with edge application server 210. The application client 230 may cause UE 115 to establish a connection with edge application server 210 to exchange application data traffic 235. Once the connection is established, the UE 115 may use the compute capabilities of the selected edge application server 210. For example, application client 230 may communicate data to edge application server 210 for computation or processing. The edge application server 210 may compute or process the data using the parameters transmitted in step 730 and communicate the processed data back to application client 230.

Figure 8:
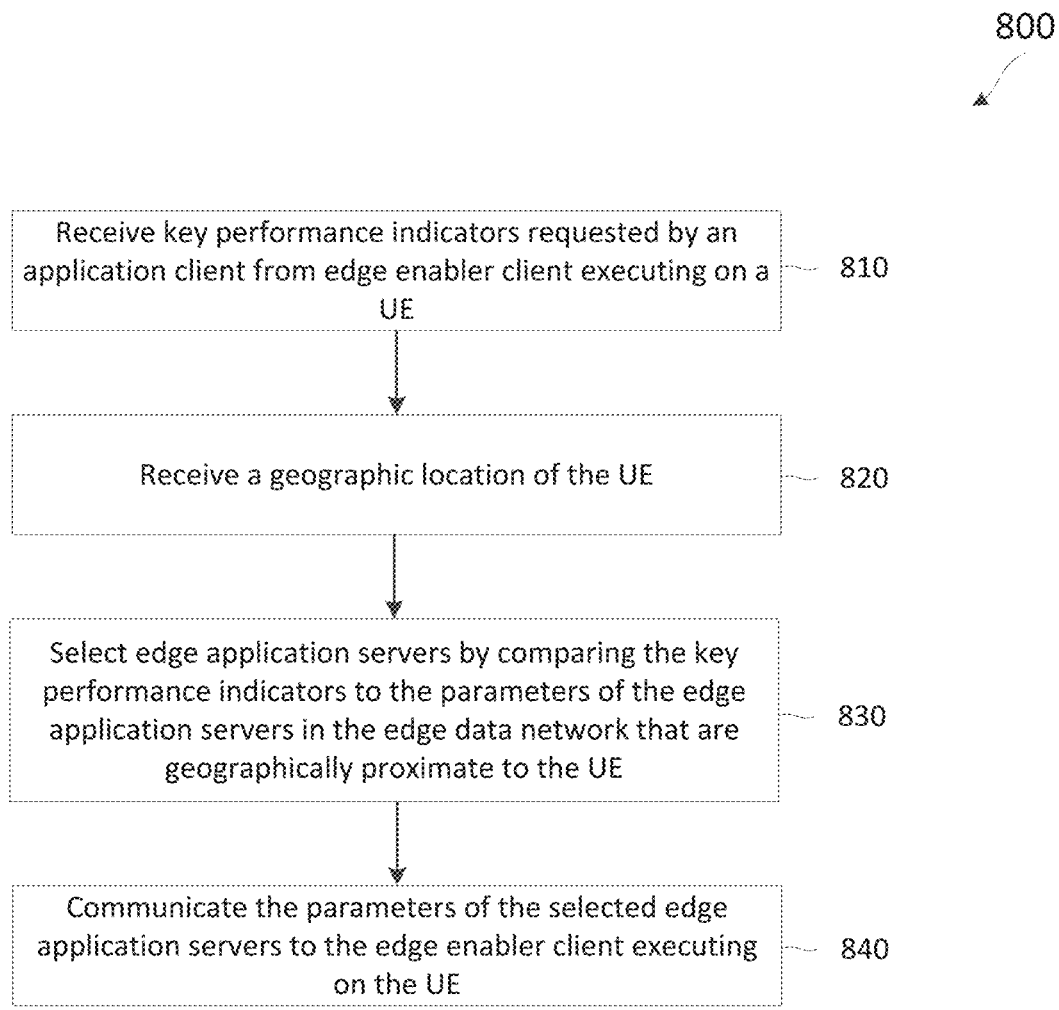
FIG. 8 is a flow diagram of a method according to some aspects of the present disclosure.

FIG. 8 is a flow diagram of a communication method 800 according to some aspects of the present disclosure. Steps of the method 800 can be executed by a computing device (e.g., a processor, processing circuit, and/or other suitable component) of an edge enabler server or other suitable means for performing the steps. For example, edge enabler server 220 may utilize one or more components, such as the processor 602, the memory 604, the transceiver 610, the modem 612, and the one or more antennas 616, to execute the steps of method 800. As illustrated, the method 800 includes a number of enumerated steps, but aspects of the method 800 may include additional steps before, after, and in between the enumerated steps. In some aspects, one or more of the enumerated steps may be omitted or performed in a different order.

At step 810, the method 800 includes receiving parameters with KPIs. For example, edge enabler server 220 may receive a request message that includes KPIs of application client 230 from edge enabler client 240 that executes on UE 115.

At step 820, the method 800 includes receiving geographic location of the UE 115. For example, edge enabler server 220 may receive the geographic location of UE 115 that communicated the KPI parameters either from UE 115 or BS 105 or another component in wireless communication network 100.

At step 830, the method 800 includes selecting one or more edge application servers using the KPIs and the geographic location. For example, edge enabler server 220 may compare the KPIs received in step 810 to edge application server parameters associated with edge application servers 210 that are within the geographic proximity of UE 115. The geographic proximity may be a distance that is less than a configurable distance threshold between edge application server 210 and UE 115. Based on the comparison, edge enabler server 220 may identify one or more edge application servers 210 that have parameters that meet or exceed the KPI parameters transmitted from UE 115.

At step 840, the method 800 includes communicating the response message that includes the parameters of edge application servers 210 in edge data network 120 selected in step 830. As discussed above, the parameters may be used to select one of edge application servers 210 to compute data on behalf of application client 230 associated with KPIs received in step 810.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A method of establishing communication, comprising:
   communicating, by a user equipment (UE), first key performance indicators requested by an application client executing in the UE, to a device in an edge data network;

receiving, from the device, a plurality of messages with
parameters associated with a plurality of edge application servers in the edge data network, wherein the parameters identify processing capabilities of the plurality of edge application servers, and wherein one message in the plurality of messages is associated with a set of parameters from the parameters corresponding to one server in the plurality of edge application servers, the set of parameters including at least one central processing unit (CPU) compute parameter, at least one graphical compute parameter, at least one memory parameter, and at least one storage parameter different from the memory parameter;
selecting, by the UE, an edge application server from the plurality of edge application servers based on the parameters by identifying the edge application server from the plurality of edge application servers that is associated with parameters that are closest to the first key performance indicators as compared to parameters associated with other edge application servers of the plurality of edge application servers;
determining, based on the parameters associated with the selected edge application server, that the selected edge application server has additional processing capabilities available;
generating second key performance indicators, wherein the second key performance indicators include a new indicator with a greater capability than a corresponding indicator in the first key performance indicators; and
communicating the second key performance indicators to the device in the edge data network.

2. The method of claim 1, wherein the at least one CPU compute parameter indicates CPU processing power of one of the plurality of edge application servers.

3. The method of claim 1, wherein the at least one memory parameter indicates available memory for the application client on one of the plurality of edge application servers.

4. The method of claim 1, wherein the at least one storage parameter indicates storage available for the application client on one of the plurality of edge application servers.

5. The method of claim 1, wherein processing capabilities accessible to the application client are processing capabilities of the UE and processing capabilities of the selected edge application server.

6. The method of claim 1, wherein the plurality of edge application servers are within a preconfigured distance from the UE.

7. The method of claim 1, wherein the selecting further comprises:
identifying the edge application server from the plurality of edge application servers that has a parameter that indicates a lowest latency compared to parameters indicating latencies of other edge application servers in the plurality of edge application servers.

8. The method of claim 1, wherein the selecting further comprises:
identifying the edge application server from the plurality of edge application servers that is associated with a subset of parameters from the parameters that exceeds the first key performance indicators and that has a parameter that indicates a lowest latency compared to parameters indicating latencies of other edge application servers in the plurality of edge application servers that exceed the first key performance indicators.

9. The method of claim 1, wherein the parameters are received in a single response message.

10. The method of claim 1, wherein the parameters are received in parameters allocated for media processing parameters defined using the moving picture experts group (MPEG) network.

11. The method of claim 1, wherein the parameters are received in parameters allocated for the European Telecommunications Standards Institute (ETSI) network function virtualization parameters.

12. The method of claim 1, wherein the parameters include multiple virtual parameters for the edge application server.

13. The method of claim 12, wherein the at least one CPU parameter includes a number of virtual control processing units (CPUs) that the edge application server allocates for processing data transmitted from the UE.

14. The method of claim 1, wherein the at least one graphical compute parameter includes multiple graphical processing unit parameters for the edge application server.

15. The method of claim 1, wherein the parameters include multiple storage parameters for the edge application server.

16. The method of claim 1, further comprising:
communicating, using the UE, a geographic location of the UE; and
wherein the received parameters are associated with the plurality of edge application servers within a configurable distance from the geographic location of the UE.

17. A user equipment (UE) comprising:
a transceiver configured to:
communicate first key performance indicators requested by an application client executing in the UE to a device in an edge data network; and
an edge enabler client implemented on an integrated circuit and configured to:
receive, from the device, a plurality of messages with parameters associated with a plurality of edge application servers in the edge data network, wherein the parameters identify processing capabilities of the plurality of edge application servers in the edge data network, and wherein one message in the plurality of messages is associated with a set of parameters from the parameters corresponding to one server in the plurality of edge application servers, the set of parameters including at least one central processing unit (CPU) compute parameter, at least one graphical compute parameter, at least one memory parameter, and at least one storage parameter different from the memory parameter;
select the edge application server from the plurality of edge application servers based on the parameters by identifying the edge application server from the plurality of edge application servers that is associated with parameters that are closest to the first key performance indicators as compared to parameters associated with other edge application servers of the plurality of edge application servers;
determine, based on the parameters associated with the selected edge application server, that the selected edge application server has additional processing capabilities available;
generate second key performance indicators, wherein the second key performance indicators include a new indicator with a greater capability than a corresponding indicator in the first key performance indicators; and
communicate the second key performance indicators to the device in the edge data network.

18. The UE of claim 17, wherein the at least one CPU compute parameter indicates CPU processing power of one of the plurality of edge application servers.

19. The UE of claim 18, wherein the at least one CPU parameter indicates a virtual CPU compute power available on one of the plurality of edge application servers.

20. The UE of claim 17, wherein the at least one memory parameter indicates available memory for the application client on one of the plurality of edge application servers.

21. The UE of claim 17, wherein the at least one storage parameter indicates storage available for the application client on one of the plurality of edge application servers.

22. The UE of claim 17, wherein the edge enabler client is further configured to:
    identify the edge application server from the plurality of edge application servers that is associated with a subset of parameters in the parameters that exceed the first key performance indicators and that additionally that has a parameter that indicates a lowest latency compared to parameters that indicate latencies of other edge application servers in the plurality of edge application servers that exceed the first key performance indicators.

23. A non-transitory computer-readable medium having program code recorded thereon, the program code comprising:
    code for causing an edge enabler client in a user equipment (UE) to communicate first key performance indicators requested by an application client executing on the UE to a server in an edge data network;
    code for causing the edge enabler client to receive, from the server, a plurality of messages with parameters associated with a plurality of edge application servers in the edge data network, wherein the parameters identify processing capabilities of the plurality of edge application servers, and wherein one message in the plurality of messages is associated with a set of parameters from the parameters corresponding to one server in the plurality of edge application servers, the set of parameters including at least one central processing unit (CPU) parameter, at least one graphical compute parameter, at least one memory parameter, and at least one storage parameter different from the memory parameter;
    code for causing the edge enabler client to select an edge application server from the plurality of edge application servers based on the parameters by identifying the edge application server from the plurality of edge application servers that is associated with parameters that are closest to the first key performance indicators as compared to parameters associated with other edge application servers of the plurality of edge application servers;
    code for determining, based on the parameters associated with the selected edge application server, that the selected edge application server has additional processing capabilities available;
    code for generating second key performance indicators, wherein the second key performance indicators include a new indicator with a greater capability than a corresponding indicator in the first key performance indicators; and
    code for communicating the second key performance indicators to the device in the edge data network.

24. The non-transitory computer-readable medium of claim 23, wherein the at least one CPU parameter indicates CPU processing power of one of the plurality of edge application servers and the at least one storage parameter indicates storage available for the application client on one of the plurality of edge application servers.

25. The non-transitory computer-readable medium of claim 23, wherein the at least one memory parameter indicates available memory for the application client on one of the plurality of edge application servers.

26. The non-transitory computer-readable medium of claim 23, wherein processing capabilities accessible to the application client are processing capabilities of the UE and processing capabilities of the selected edge application server.

27. The non-transitory computer-readable medium of claim 23, wherein the code for selecting the edge application server further comprises:
    code for causing the edge enabler client to identify the edge application server from the plurality of edge application servers that has a parameter that indicates a lowest latency compared to parameters that indicate latencies of other edge application servers in the plurality of edge application servers.

28. The non-transitory computer-readable medium of claim 23, wherein the code for selecting the edge application server further comprises:
    code for causing the edge enabler client to identify the edge application server from the plurality of edge application servers that is associated with a subset of parameters in the parameters that exceeds the first key performance indicators and that has a parameter that indicates a lowest latency compared to parameters indicating latencies of other edge application servers in the plurality of edge application servers that exceed the first key performance indicators.

29. A user equipment (UE) comprising:
    means for communicating first key performance indicators requested by an application client executing on the UE to a server in an edge data network;
    means for receiving, from the server, a plurality of messages with parameters associated with a plurality of edge application servers in the edge data network, wherein the parameters identify processing capabilities of the plurality of edge application servers, and wherein one message in the plurality of messages is associated with a set of parameters from the parameters corresponding to one server in the plurality of edge application servers, the set of parameters including at least one central processing unit (CPU) parameter, at least one graphical compute parameter, at least one memory parameter, and at least one storage parameter different from the memory parameter;
    means for selecting, an edge application server from the plurality of edge application servers based on the parameters by identifying the edge application server from the plurality of edge application servers that is associated with parameters that are closest to the first key performance indicators as compared to parameters associated with other edge application servers of the plurality of edge application servers;
    means for determining, based on the parameters associated with the selected edge application server, that the selected edge application server has additional processing capabilities available;
    means for generating second key performance indicators, wherein the second key performance indicators include a new indicator with a greater capability than a corresponding indicator in the first key performance indicators; and means for communicating the second key performance indicators to the device in the edge data network.

\* \* \* \* \*